(12) United States Patent
Liu et al.

(10) Patent No.: US 9,239,967 B2
(45) Date of Patent: Jan. 19, 2016

(54) INCREMENTAL IMAGE CLUSTERING

(75) Inventors: Ke-Yan Liu, Beijing (CN); Xin-Yun Sun, Beijing (CN); Tong Zhang, San Jose, CA (US); Lei Wang, Beijing (CN); Min Wang, Beijing (CN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/234,099

(22) PCT Filed: Jul. 29, 2011

(86) PCT No.: PCT/CN2011/001242
§ 371 (c)(1),
(2), (4) Date: Jan. 21, 2014

(87) PCT Pub. No.: WO2013/016837
PCT Pub. Date: Jul. 2, 2013

(65) Prior Publication Data
US 2014/0169673 A1    Jun. 19, 2014

(51) Int. Cl.
*G06K 9/68* (2006.01)
*G06K 9/62* (2006.01)
*G06F 17/30* (2006.01)

(52) U.S. Cl.
CPC ........ *G06K 9/6218* (2013.01); *G06F 17/30247* (2013.01); *G06K 9/6219* (2013.01)

(58) Field of Classification Search
CPC ....... G06K 9/00; G06K 9/48; G06K 9/00228; G06K 9/00222; G06K 9/00287; G06K 9/00281; G06K 9/00248; G06K 9/6407; G06K 9/6423; G06K 9/6476; G06K 9/00084; G06K 9/6218
See application file for complete search history.

(56) References Cited

U.S. PATENT DOCUMENTS

| 5,832,182 A | 11/1998 | Zhang et al. |
| 6,751,343 B1 | 6/2004 | Ferrell et al. |

(Continued)

FOREIGN PATENT DOCUMENTS

| CN | 1959705 A | 5/2007 |
| CN | 1979490 A | 6/2007 |

(Continued)

OTHER PUBLICATIONS

Hammouda, K. M., et al., "Incremental document clustering using cluster similarity histograms," IEEE/WIC International Conference on Web Intelligence (WI'03), pp. 597-601, 2003.

(Continued)

*Primary Examiner* — Amir Alavi
(74) *Attorney, Agent, or Firm* — Mahamedi Paradice LLP (57) ABSTRACT

Methods, systems, and computer readable media with executable instructions, and/or logic are provided for incremental image clustering. An example method for incremental image clustering can include identifying, via a computing device, a number of candidate nodes from among evaluated leaf image cluster (LIC) nodes on an image cluster tree (ICT) based on a similarity between a feature of a new image and an average feature of each of the evaluated LIC nodes. The evaluated nodes include at least one node along each path from a root node to either a leaf node or a node having a similarity exceeding a first threshold. A most-similar node can be determined, via the computing device, from among the number of candidate nodes. The new image can be inserted to a node associated with the determined most-similar node, via the computing device.

14 Claims, 4 Drawing Sheets

(56) References Cited

U.S. PATENT DOCUMENTS

| | | | |
|---|---|---|---|
| 6,993,180 | B2 | 1/2006 | Sun et al. |
| 7,031,909 | B2* | 4/2006 | Mao et al. .......................... 704/9 |
| 7,315,785 | B1* | 1/2008 | Nozaki et al. ................... 702/19 |
| 8,117,204 | B2* | 2/2012 | Girgensohn et al. .......... 707/737 |
| 2006/0136478 | A1* | 6/2006 | Berkner ........................ 707/102 |
| 2010/0149212 | A1 | 6/2010 | Fukuya et al. |
| 2012/0102037 | A1* | 4/2012 | Ozonat ......................... 707/738 |
| 2012/0106847 | A1* | 5/2012 | Qi ................................. 382/195 |
| 2013/0262966 | A1* | 10/2013 | Wu et al. ....................... 715/202 |
| 2014/0169673 | A1* | 6/2014 | Liu et al. ....................... 382/170 |

FOREIGN PATENT DOCUMENTS

| | | |
|---|---|---|
| CN | 101359368 | 2/2009 |
| JP | 2008269076 A | 11/2008 |

OTHER PUBLICATIONS

Huang, Gary B., et al., "Labeled Faces in the Wild: A Database for Studying Face Recognition in Unconstrained Environments," University of Massachusetts, Amherst, Technical Report 07-49, Oct. 2007.

Cai, Deng et al., "Hierarchical Clustering of WWW Image Search Results Using Visual, Textual and Link Information," (Research Paper), Publication date: 2004, pp. 952-959.

Chum, Ondrej et al., "Web Scale Image Clustering," (Research Paper), Publication date: May 23, 2008.

International Search Report & Written Opinion received for PCT Application No. PCT/CN2011/001242; May 10, 2012, 12 pages.

Extended European Search Report received in EP Application No. 11870198.6, Feb. 19, 2015, 9 pages.

Gallagher, A., et al., "Clothing Cosegmentation for Recognizing People", IEEE Conference on Computer Vision and Pattern Recognition, 2008.

Hammouda, K. M., et al., "Incremental document clustering using cluster similarity histograms," IEEE/WIC Intl. Conf. on Web Intelligence (WI'03), pp. 597-601, 2003.

Huang, Gary B., et al., "Labeled Faces in the Wild: A Database for Studying Face Recognition in Unconstrained Environments," U-Mass., Tech. Rpt 07-49, Oct. 2007.

Pulla, C. et al., "Efficient Semantic Indexing for Image Retrieval," Pattern Recognition (ICPR), 2010 20th International Conference IEEE, Aug. 23, 2010, pp. 3276-3279.

Saravanan Thirumuruganathan, "A Detailed Introduction to K-Nearest Neighbor (KNN) Algorithm," May 17, 2010, (http://www.cs.umd.edu/-samir/498/10algorithms-08.pdf).

Vijaya, P.A., et al., "Leaders-Sub leaders: An efficient hierarchical clustering algorithm for large data sets," Pattern recognition Letters, pp. 505-513, 2004.

Wikipedia, "K-nearest neighbors algorithm," Jun. 1, 2011, <http://en.wikipedia.org/w/index.php?title=K-nearest_neighbors_algorithm&oldid=4319603.

Zhang, T. et al., "BIRCH: An Efficient Data Clustering Method for Very Large Databases," Proc. of the 1996 ACM SIGMOD Intl. Conf. Mgt of Data, Jan. 1, 1996, pp. 103-114.

\* cited by examiner

INCREMENTAL IMAGE CLUSTERING

This application is a 371 of PCT/CN2011/001242 filed on Jul. 29, 2011.

BACKGROUND

With increasing Internet data transfer speeds and the prosperity of WEB 2.0, the amount of image data on the Internet is ever-growing. Image-based websites, such as Flickr, Picasa, You-tube, etc., are growing in popularity, making online content-based image management more important than ever. Since new image data is being uploaded to the Internet all the time, how to efficiently organize, index, and retrieve desired image data is a constant challenge. Categorizing image data can be an enormous endeavor. Efficiently integrating new image data with previously categorized image data without introducing too much complexity and computational cost is important as the collection of image data increases. Avoiding having to re-cluster existing image data can be beneficial in terms of computational time and effort.

Clustering is used to divide a large amount of image data into a number of subsets, e.g., clusters, where image data in a particular cluster is similar in some regard with each other. In general, clustering methods can be categorized into partitioning methods, hierarchical methods, density-based methods, grid-based methods, and model-based methods. For example, K-Means is a partitioning method, DBSCAN divides data based on data density, and Hierarchical Agglomerative Clustering (HAC) constructs a hierarchical structure, namely a dendrogram, of the whole dataset. These methods can be run in batch or static mode, which are not appropriate in a dynamic environment where image data is updated at random moments over time.

DETAILED DESCRIPTION

Examples of the present disclosure may include methods, systems, and computer readable media with executable instructions, and/or logic. According to one or more examples of the present disclosure, new images are clustered incrementally without re-clustering existing images. The incremental image clustering method described herein uses a hierarchical matching model to make incremental image clustering more efficient with little loss in effectiveness. The example described is directed to a method for clustering faces based on facial features of detected faces in images. However, examples of the present disclosure are not limited to applications involving only facial clustering, and may be applied to clustering involving any subject matter that can be detected and identified in image data, such as items, geography, clothing, animals, etc.

Incremental clustering, e.g., online clustering, is proposed for a dynamic environment in which new data is continually added to the dataset. The challenge for incremental clustering is to find the most appropriate cluster to which to add new image data. In addition, the method described herein can be invariant to the arriving order of the image data. Furthermore, it is desired that the incremental image clustering method of the present disclosure has the ability to periodically reassign data among clusters so as to increase cluster coherency. For all these reasons, a hierarchical matching model utilizing incremental image clustering is described.

In a single pass clustering method of a previous approach, the whole dataset is scanned once. When a new data point arrives, the matching score of the data point is computed with existing clusters sequentially according to a certain metric. If the pre-defined condition is satisfied, the new data point is added to the best matching cluster; otherwise a new cluster is created. One metric to compute the matching score is simply the similarity between the data point and a cluster which is computed by visiting each member of the cluster, or by visiting a representative or leader point of the cluster.

A two level clustering method of a previous approach called "Leaders-Subleaders" is an extension of the leader method. Another metric for clustering performance can be the delta change of similarity ratio. Clusters are represented using a cluster similarity histogram to show the distribution of similarity within each cluster. The similarity ratio derived from similarity histogram can be used to represent the cluster coherency. If a new point increases the similarity ratio of a cluster or does not decrease it to certain extent, it is added to the cluster.

A K-Nearest Neighbor Clustering (KNN) method of another previous approach computes the top-K similar data points in the database with the new data point and adds the new point to the cluster which holds the most of the K points. The time complexity of this method is proportional to the size of the dataset. With respect to a Cluster Feature Tree, a cluster is represented using a single feature. The Cluster Feature Tree is a variant of a child node-limited tree method that stores the description of all clusters in a tree structure, which is used to reduce the cost of similarity computation by comparing the new point with only part of the tree. The ICTree clustering method of the present disclosure, a hierarchical matching model, works in the context of image features and includes some significant changes with respect to previous image clustering approaches, such as a conventional Cluster Feature Tree.

Figure 1:
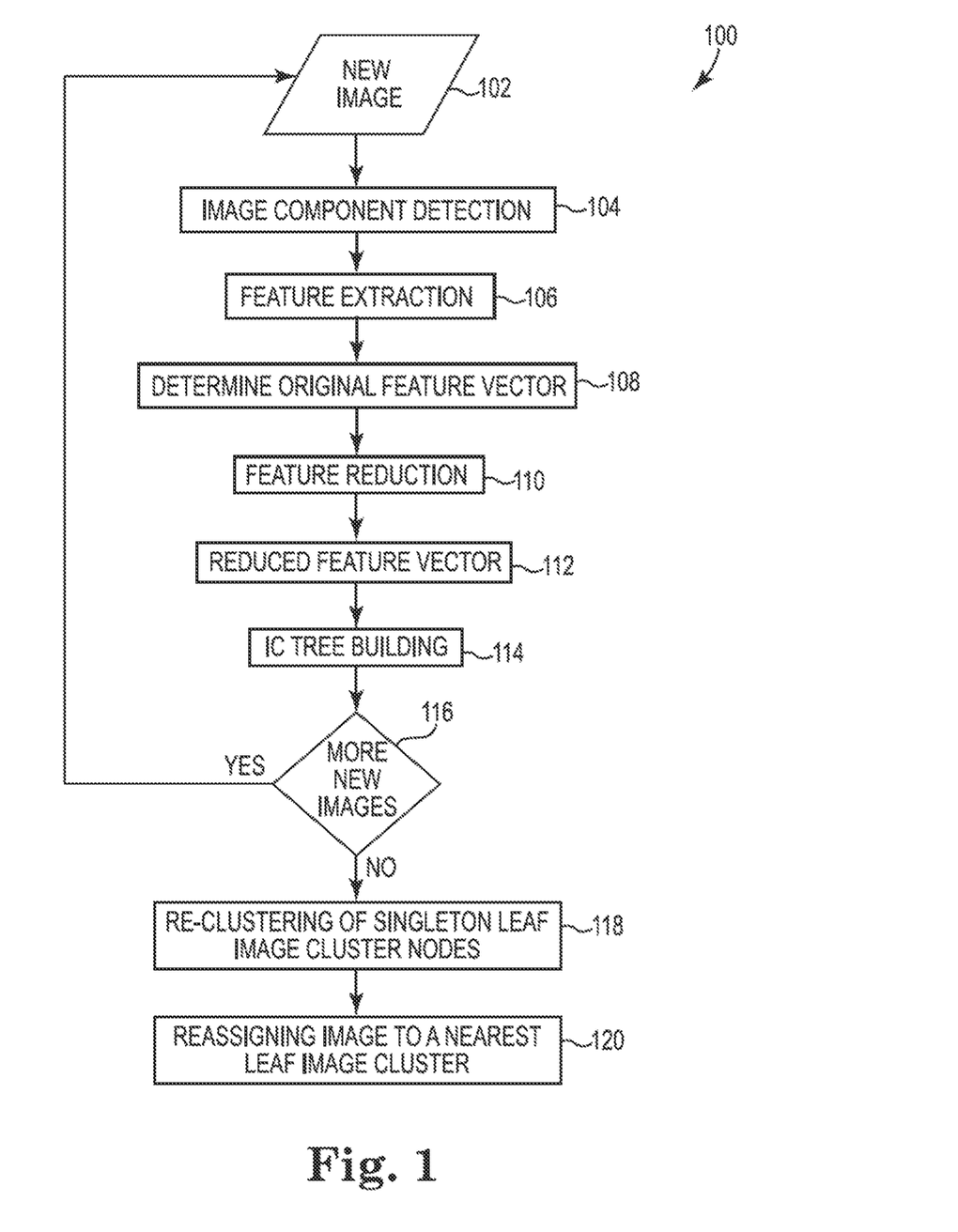
FIG. 1 illustrates a flow chart of a method for incremental image clustering according to the present disclosure.

FIG. 1 illustrates a flow chart of a method for incremental image clustering 100 according to the present disclosure. A new image can be received, as shown at 102. Image component detection 104, e.g., a face, can be performed on the new image. After detection of an image component, feature extraction 106 can be performed and an original feature vector can be determined 108. The feature can be reduced, for example, as shown at 110 to arrive at a reduced feature vector 112. Based on the reduced feature vector 112, incremental clustering tree building can occur, as shown in FIG. 1 at 114. A determination can be made as to whether more new images are pending, as shown at 116. If new images are available, the process flow for the incremental image clustering method 100 can return to repeat the above-described process for the new image 102. If new images are not available, such idle time can be used to re-cluster singleton leaf image cluster node(s) 118, reassigning an image to a nearest leaf image cluster 120.

Figure 2:
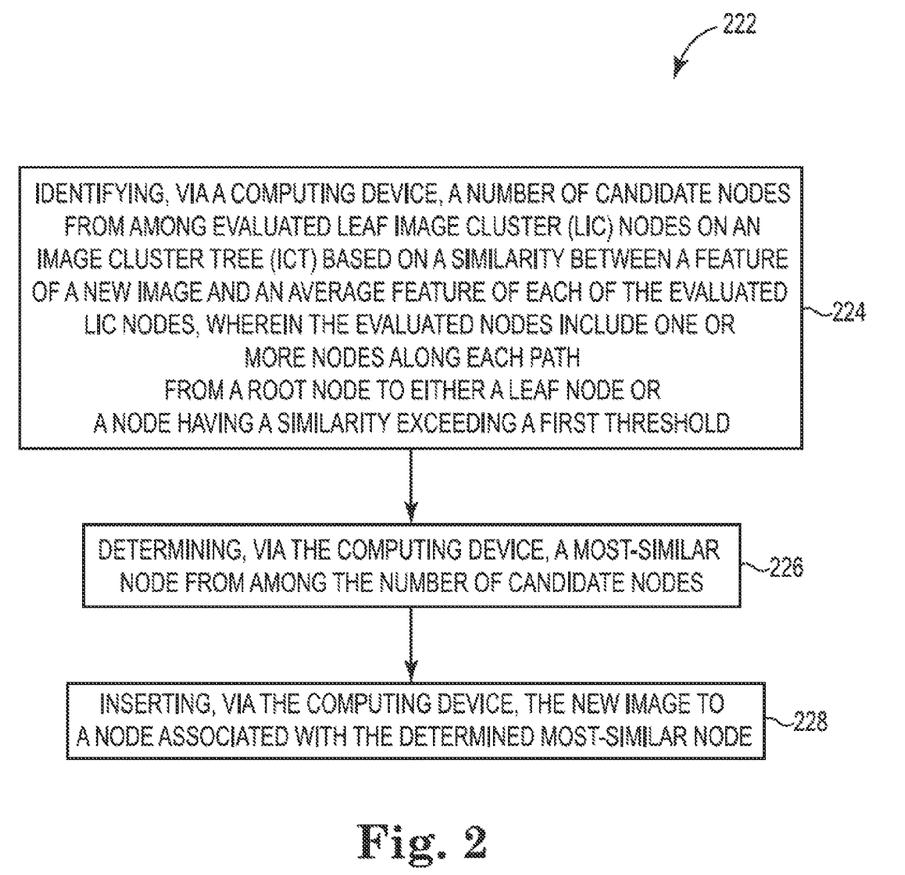
FIG. 2 illustrates a flow chart of a method for incremental cluster tree building according to the present disclosure.

FIG. 2 illustrates a flow chart of a method for incremental cluster tree building according to the present disclosure. According to various examples of the present disclosure, the example method shown in FIG. 2 can correspond to incremental cluster tree building 114 shown in FIG. 1. The incremental cluster tree building portion of the example method for incremental image clustering can include identifying, via a computing device, a number of candidate nodes from among evaluated leaf image cluster (LIC) nodes on an image cluster tree (ICT) based on a similarity between a feature of a new image and an average feature of each of the evaluated LIC nodes. The evaluated nodes include one or more nodes along each path from a root node to either a leaf node or a node having a similarity exceeding a first threshold. A most-similar node can be determined, via the computing device, from among the number of candidate nodes. The new image can be inserted to a node associated with the determined most-similar node, via the computing device. A more detailed example of the above-described method is provided below with respect to FIG. 3.

Various image features can be used to capture the visual characteristics of an image according to the present disclosure. Generic features, e.g. color, texture, shape, etc. can be used in content-based image retrieval. Other domain-specific features such as face features can be exploited in many applications. As mentioned above, the incremental image clustering method of the present disclosure is illustrated using an example involving face features. According to various examples, face clustering can utilize, for example, the Gabor feature and LBP discriminant analysis for face verification feature can be used to describe the characteristics of a single face. Once these features are extracted from face detected in an image, they can be concatenated to form one single feature vector. Principal Component Analysis (PCA) can then be applied for dimension reduction. In this manner a single face can be represented as $I_i=<ID_i, V_i>$ where $ID_i$ is the face identifier, and $V_i$ is the feature vector of this face.

Different metric comparison models can be used to measure the difference between two feature vectors. For example, Euclidean and Manhattan distances are two commonly used feature vector similarity measures in data clustering. According to one or more examples, the Euclidean measure and the Normalized Correlation metric are used to compute the similarity between two feature vectors. The final matching score between two facial feature vectors can be the weighted sum of Euclidean distance and Normalized Correlation score. Other methods can also be used.

An Image Cluster (IC) is defined as a three-dimension tuple that contains the following information of the cluster: (1) the number of images contained in this cluster, (2) the sum feature vector of this cluster, (3) the set of identifiers of images in the cluster. Accordingly, one definition of an image cluster is as follows: Given N images $\{I_1, I_2, \ldots, I_N | I_i=<ID_i, V_i>\}$ in an image cluster, the image cluster $IC=<N, V_N, ID_N>$, where N is the number of images, $V_N$ is the sum feature of the individual image feature vectors, i.e., $$V_N = \sum_{k=1}^{N} V_k,$$

and $ID_N$ is the set of image identifiers, i.e., $ID_N=\{I_1, I_2, \ldots, I_N\}$.

The Image Cluster is designed to represent the average feature of the images in a particular cluster such that when a new image arrives, the similarity between the feature vector of the new image and the feature vector of the cluster is computed. If the similarity is below certain threshold, then the new image cannot be added to the particular cluster. Due to an additive property of image features, the merging of two disjoint image clusters can be defined as follows: Given two disjoint image clusters $IC_i=<N_i, V_i, ID_i>$ and $IC_j=<N_j, V_j, ID_j>$, the combined cluster $IC_{ij}$ of the two clusters is $IC_{ij}=<N_i+N_j, V_i+V_j, ID_i \cup ID_j>$.

The Image Cluster Tree (ICTree) encompasses the concepts of Image Cluster and incrementally inserting a new image. The ICTree is a compact tree which can include the characteristics of the whole image dataset. A new image can be guided to its most-similar cluster efficiently by visiting part of all possible paths in the tree.

According to some examples of the present disclosure, there are two pruning thresholds for the IC tree: $\delta_1$ and $\delta_2$, where $0<\delta_1<\delta_2<1$, and one branching factor B. The loose threshold $\delta_1$ controls whether to continue searching along a current path in the ICTree or not, while the tight threshold $\delta_2$ determines whether a new image can be added to a particular cluster. The branching factor B can be the maximum child node of an image cluster node. According to various examples, the minimal branching factor of a node can be set to one, e.g., by default, for example. Therefore, no explicit factor is defined, for example.

The nodes in an ICTree can be divided into two types: a Leaf Image Cluster (LIC) node and a Non-Leaf Image Cluster (NIC) node. The Leaf Image Cluster node is a cluster containing one or more images, which can be the same as Image Cluster. That is, $LIC=<N, V_N, ID_N>$. The average feature vector of a LIC node is: $V_{avg}=V_N/N$.

A NLIC node includes several child image cluster nodes, which is similar to a Combined Image Cluster; however, a NLIC has entries to its child Image Clusters Node. That is, given m Image Cluster Nodes $\{IC_i=<N_i, V_i, \ldots >|i=1, \ldots, m\}$, a Non-Leaf Image Cluster Node that combines the m Image Cluster Nodes can be represented as $NIC=<N, V, \{Child_i|i=1, \ldots, m\}>$ where N is the total number of images under the cluster node, i.e., $$= \sum_{i=1}^{m} N_i,$$

V is the sum feature vector of all the child IC nodes, i.e., $$V = \sum_{i=0}^{m} V_i$$

and $Child_i$ is the pointer to the $i^{th}$ child. The average feature vector of a NLIC node is $V_{avg}=V/N$.

The difference between an LIC node and NIC node can be that a LIC node contains information of the images while NIC nodes keep the information of its child IC nodes. The similarity of two IC nodes is the matching score of the average feature vectors of the two nodes.

Figure 3:
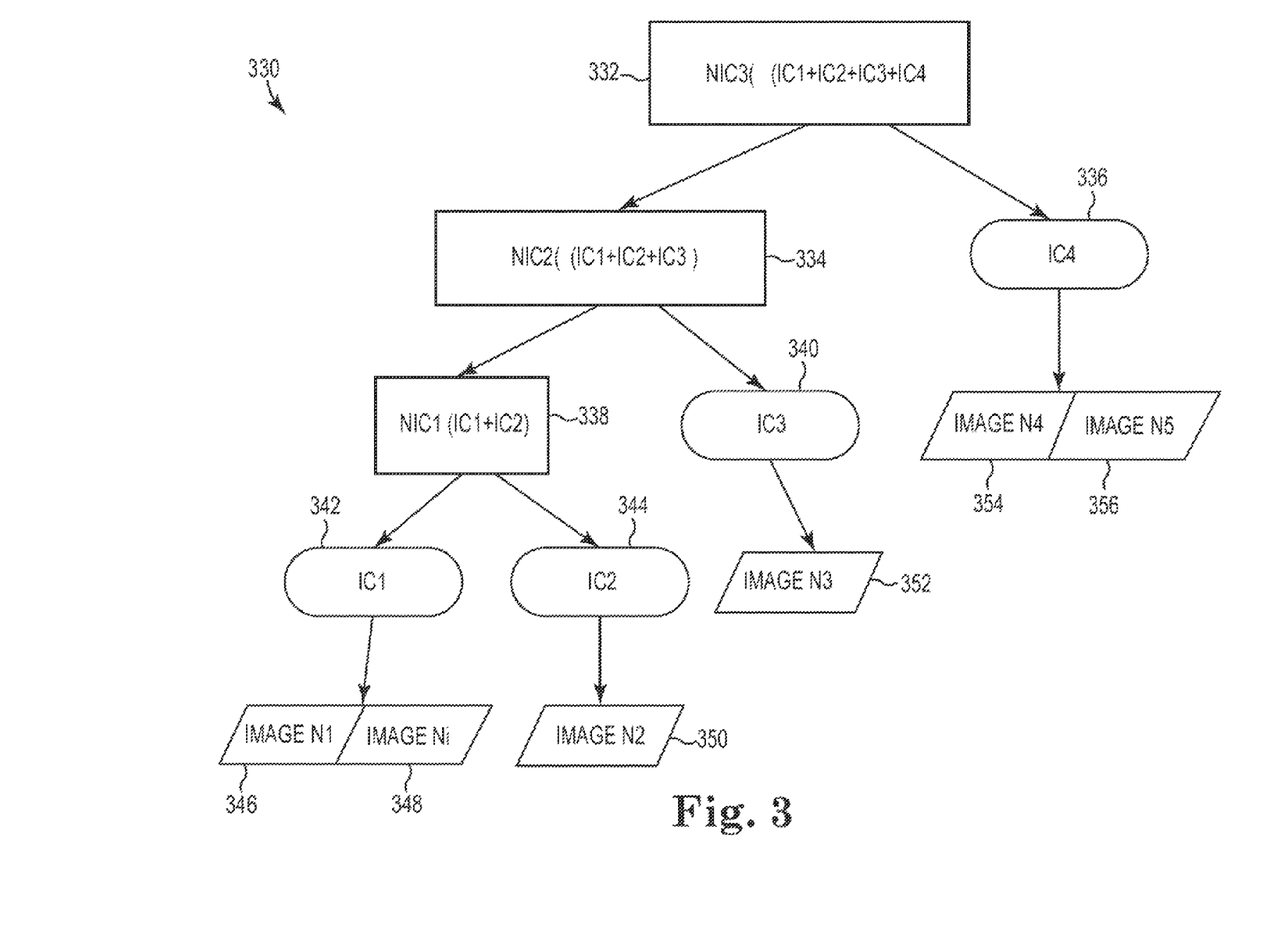
FIG. 3 illustrates a block diagram of an example incremental cluster tree according to the present disclosure.

FIG. 3 illustrates a block diagram of an example incremental cluster tree 330 according to the present disclosure. Image cluster 1 (346) includes image $N_1$ (346) and image $N_i$ (348). Image cluster 2 (344) includes image $N_2$ (350). Image cluster 3 (340) includes image $N_3$ (352), and image cluster 4 (336) includes image $N_4$ (354) and image $N_5$ (356). Each of image clusters 1-4 are Leaf Image Clusters (LIC). Non-Leaf Image Cluster (NIC) 1 (338) includes image clusters 1 (342) and 2 (344). NIC 2 (334) includes NIC 1 (338) and image cluster 3 (340). NIC 3 (332) includes NIC 2 (334) and image cluster 4 (336). Note that an Image Cluster Tree need not be guaranteed to be height balanced and that a LIC node can contain more than one image.

As previously described with respect to FIG. 1, when a new image arrives, feature extraction and dimension reduction are firstly done to obtain the feature vector. A global image identifier can be assigned to the new image. Given the new image $I_{new}=<ID_{new}, V_{new}>$, the method to insert the new image to an existing ICTree can be as follows:

(1) Identify candidate ICTree nodes into which the image might be inserted. Starting from the root, the similarity between the new image feature and the average feature of a particular IC node encountered along the path is computed recursively until it falls below a preset threshold, or the current IC node encountered is a leaf node. If the current node is a LIC node, the similarity can be compared with the threshold $\delta_2$. If the condition is satisfied, e.g., the similarity is greater than the threshold, then current LIC node can be added to the candidate set and the matching score can be recorded. Otherwise, the parent of the current node can be added to the candidate set along with the matching score (i.e., add the new node as the sibling of the currently encountered node).

(2) Find the most appropriate node from the candidates. All the candidate nodes can be according to the matching score associated therewith and find the most-similar node. If the candidate nodes are empty, i.e., no candidate nodes were identified, then a new leaf node can be initiated and added as the sibling of the current root. The addition of a new leaf node to the previous root leads to creation of a new root node, which increases the height of the ICTree.

(3) Insert the new image to the most appropriate node. If the most-similar node, e.g., as determined from the matching scores, is a LIC node, then the feature of the new image can be added to the node directly. Otherwise, a new LIC node containing the current image feature can be created. The new leaf node can be inserted as a child node of the most-similar node. If the number of child nodes of the currently encountered node exceeds the branching factor B, it can be split.

(4) Update nodes in the path from the modified node to the root. The feature of the new image can be added to each successive node towards the root, and the image number corresponding to each of the nodes can be updated along the path, e.g., from the modified node to the root.

When a new node entry is added to a NLIC node that already contains B child nodes, the node can be split. While no explicit splitting strategy is presented here, various techniques can be utilized to re-cluster and separate elements of the clustering, including the new feature. For example, image clustering can result in splitting such that two or more nodes result, and similar child nodes are more likely to be the children of a same IC node. Accordingly, a sub clustering on all the average features of the child nodes can be completed. More specifically, the clustering can be K-Means, HAC, or any other clustering method such as 2-Means. After clustering child nodes, at least two new non-leaf IC nodes can be constructed, which can be used to replace the original node (having more than B child nodes). If size of the parent node exceeds B, similar splitting can be conducted recursively for each subsequent parent node.

Deleting an image from the existing ICTree can include first finding the LIC node containing the image. The image feature can be subtracted from the sum feature of the cluster. Accordingly, the image number of the leaf Image Cluster node can be decreased. The same operation can be conducted recursively from the first-modified node back to the root. During the deleting procedure, if there is a node containing no image or no child node, the node can be deleted, with the deletion propagated up the tree until the root node.

For incremental clustering, the arriving order of images can have a direct impact on the final clustering result. To reduce the influence of the input order, a timestamp can be added to each cluster node to indicate the last modified time of the node. Each image can have the timestamp indicating when it was inserted into the ICTree. When the clustering is finished, an image can be reinserted to the ICTree by computing the similarity with nodes with a timestamp (indicating last modification) later than the insertion timestamp of the image. In this way, the input order of images can be less influential on the final clustering result. Another feasible approach is to reassign each image to all the final LIC nodes (discussed further below).

As was briefly discussed with respect to FIG. 1 at 118 and 120, to further enhance the quality of the clustering, several post-processing methods can be conducted on the original ICTree clustering result. These two post processing methods may be implemented when a new image is not being processed for addition to the ICTree.

Due to the uncertainty in threshold selection and the input order of images, the final clustering result may not be so desirable. At the same time, there may be many singleton clusters which contain one image if the threshold $\delta_2$ is tight enough. Therefore, according to some examples, further processing on the LIC nodes of the tree can be conducted. It will be appreciated that the average feature of each LIC node can actually be the centroid of the images in that cluster. Each leaf node may be regarded as a single point and further clustering can be done to produce a more accurate result (where computational time is available, such as when new image processing is not occurring). In this way, the number of singleton clusters can be largely reduced.

The LIC nodes reveal the overall distribution of the current image dataset and can be viewed as the skeleton of the whole dataset. To minimize the influence of input data order, each image may be reassigned to its nearest, e.g., most similar, image cluster. In this manner, two same images inserted at different time can be certain to be placed in the same cluster. As mentioned above, methods of the present disclosure can be applied to face clustering. However, the methods presented here are universal and can be applied to other image features, e.g., other than faces.

Experiments have been conducted to compare the method of the present disclosure with a hierarchical ascendant clustering (HAC) method and a Canopy+K-Means, which is a variant of the K-Means method that uses canopy clustering for the initialization of K-Means. In the conducted experiments, clustering was based on face features. That is, each cluster is intended to include faces belonging to the one person, and exclude faces belonging to other people, which should be associated with other, different, clusters. The faces detected as conflicting with the ground truth were regarded as false alarms and thus not taken into account in these evaluations.

The parameters $\delta_1$ and $\delta_2$ of ICTree were set to 0.42 and 0.61 respectively, and B was set to 100. The parameters $T_1$ and $T_2$ of Canopy were set to 0.53 and 0.5 respectively. The method tested in the experiments used a two pass technique. In the first pass, complete-linkage is exploited and the stopping threshold is 0.618. The average-linkage HAC is adopted in the second pass where the stopping threshold is 0.53.

Experiments and comparisons are made on images from two labeled public image face datasets. The first labeled public image face dataset used was the Labeled Faces in the Wild (LFW) dataset, which contains more than 13,000 face images collected from the Internet. Each face is labeled with the name of the person. A first test set (LFWS) was formed by selecting pictures of 20 people from the LFW dataset. Images with more than one face were discarded.

The second labeled public image face dataset used was the CMU Gallagher Collection Person Dataset (GCPD). The GCPD dataset is a set of family photos, including 589 images involving 32 different people. Detailed information of the two datasets is summarized in Table 1.

TABLE 1

Dataset Information

| Dataset Name | No. Persons | Total No. Pictures | No. Related Faces |
|---|---|---|---|
| LFWS | 20 | 1906 | 1702 |
| GCPD | 32 | 589 | 852 |

To measure the clustering quality, two quality metrics widely used in clustering algorithm evaluation were adopted. One is an entropy metric, which is used to measure the homogeneity of un-nested clusters for the clusters at one level of a hierarchical clustering. The lower the homogeneity of a cluster, the higher its entropy, and vice versa. For each cluster j in the clustering result, the probability that a member of cluster j belongs to class i is denoted as $P_{ij}$. Then the entropy of each cluster j is computed using the following formula where the sum is taken over all classes in the cluster:

$$E_j = -\sum_i p_{ij}\log(P_{ij})$$

The total entropy for clustering result C is the sum of the entropies of each cluster weighted by the size of each cluster as defined in the formula below, where $n_j$ is the size of cluster j, n is the total number of faces, and m is the number of clusters:

$$E_C = \sum_i^m \frac{n_j * E_j}{n}$$

The other measure of clustering quality evaluated was the F-measure, which integrates precision and recall into one metric. Precision refers to the fraction of the images retrieved that are relevant to a users information need. Recall refers to the fraction of the images that are relevant to a query that are successfully retrieved. The precision and recall of cluster j corresponding to class i are calculated as shown in the formulas immediately below where $n_{ij}$ is the number of members of class i in cluster j, $n_i$ is the size of class i, and $n_j$ is the size of cluster j.

$$\text{Precision}(i, j) = \frac{n_{ij}}{n_j}, \text{Recall}(i, j) = \frac{n_{ij}}{n_i}$$

The F-measure of cluster j and class i is then given by the following formula:

$$F(i, j) = \frac{2 * \text{Precision}(i, j) * \text{Recall}(i, j)}{\text{Precision}(i, j) + \text{Recall}(i, j)}$$

The F-measure of any class is the maximum value it attains with any cluster. An overall value for the F-measure is computed according to the following formula, where n is the total number of faces:

$$F = \sum_i \frac{n_i * \max\{F(i, j)\}}{n}$$

A larger overall F-measure indicates better clustering, and vice versa.

Due to various face orientations and/or expressions, faces of one person can be associated with not only a cluster of the person as the dominant person, but some images of the person may be associated with one or more clusters of other people (e.g., a face may look more similar to another person due to a particular face orientation and/or expression). That is, clusters can have many correctly-associated images of the dominant person, and some incorrectly-associated images of other than the dominant person. The total number of clusters is shown in Table 4, which reflects this phenomenon.

In terms of clustering efficiency, the actual clustering time is taken into account. Actual clustering time does not include the time spent on face feature extraction.

Table 2 shows the entropies obtained with the different clustering methods on the two test sets of data. Results for the initial ICTree clustering method are shown, along with results for the ICTree clustering method with singleton clusters merged (ICTree Merged). Experimental results show that the proposed method has good accuracy and high efficiency. For the LFWS dataset, the ICTree clustering method has better entropy than the HAC or Canopy K-Means methods, as indicated by the smaller value. Since a cluster has lower entropy when the purity is higher, clusters obtained by ICTree method of the present disclosure are more pure than other methods in dataset LFWS. The merging of singletons decrease the entropy by three percent (3%). With respect to the GCPD test set however, Table 2 shows the HAC method performed best while the results of the ICTree method of the present disclosure are better than results obtained from the Canopy K-Means method.

TABLE 2

Entropy comparison of different clustering methods

| Dataset | ICTree | ICTree Merged | HAC | Canopy + K-Means |
|---|---|---|---|---|
| LFWS | 0.0542 | 0.085 | 0.1341 | 0.2546 |
| GCPD | 0.4996 | 0.5495 | 0.3712 | 0.6465 |

Table 3 shows the F-measure results obtained on the two test datasets with different methods. As shown in Table 3, the HAC method provided the best performance in terms of F-measure, as indicated by the larger values. The F-measure for the ICTree clustering method of the present disclosure is approximately 17%-20% less than the F-measure for the HAC method. However, the F-measure for the ICTree clustering method of the present disclosure indicates an approximately 10%-20% improvement over the Canopy K-Means method. The merging of singleton clusters (ICTree Merged)

method decreases the total number of clusters, and therefore increases the F-measure to a small extent.

TABLE 3

F-measure comparison of different clustering methods

| Dataset | ICTree | ICTree Merged | HAC | Canopy + K-Means |
|---|---|---|---|---|
| LFWS | 0.7118 | 0.7119 | 0.8882 | 0.5458 |
| GCPD | 0.5988 | 0.6023 | 0.8218 | 0.4782 |

Table 4 lists the total cluster number for each of the clustering methods tested against each of the two test datasets. Table 4 shows the total number of clusters of the ICTree method of the present disclosure is larger than for the benchmark HAC or Canopy K-Means methods. The reason for this result is believed to be that since the average feature is the overall description of the cluster, it may lose some information (e.g., through averaging). Also, the tight threshold used can produce smaller clusters.

TABLE 4

Total cluster number with different clustering methods

| Dataset | ICTree | ICTree Merged | HAC | Canopy + K-Means |
|---|---|---|---|---|
| LFWS | 376 | 317 | 131 | 139 |
| GCPD | 220 | 178 | 97 | 87 |

The time cost associated with the different clustering methods tested on the two test datasets is listed in Table 5. With a same size of input, the ICTree method of the present disclosure is much more time-efficient than the HAC method, and performs in an approximately the same time range with Canopy K-Means method. HAC consumes the longest time for iteratively computing the similarity between clusters. Canopy K-Means can spend much time on the iterative computation of new centroids when the size of a dataset is large enough. Since there are more singletons after initial incremental clustering on GCPD test set, the merging process on GCPD takes more time than that on LFWS.

TABLE 5

Efficiency comparison of different clustering methods

| Dataset | ICTree | ICTree Merged | HAC | Canopy + K-Means |
|---|---|---|---|---|
| LFWS | 00:00:14 | 00:00:15 | 00:24:01 | 00:00:12 |
| GCPD | 00:00:18 | 00:00:25 | 00:09:48 | 00:00:07 |

The parameters of the ICTree method of the present disclosure (e.g., $\delta_1$, $\delta_2$, and/or B) can have significant influence on the final clustering result. Optimal parameter values can be set according to the particular application to which the ICTree method of the present disclosure is applied based on such factors as time efficiency required, dataset type and size, and desired performance. Optimal parameter values can be set using manual turning and/or cross validation on a training dataset, among other methods, for a particular application.

From the above-discussed comparative experimental results, the utility and efficiency of the ICTree method of the present disclosure were demonstrated using the facial features of various images from datasets of different scope. In terms of entropy and F-measure, the ICTree method of the present disclosure has approximate performance with an HAC method and outperforms a Canopy K-Means method. The ICTree method of the present disclosure exhibited better time efficiency than the HAC method.

The ICTree method of the present disclosure can have significant efficiency benefits when working with large scale image datasets (e.g., having large quantities of images) since new images can be naturally inserted to the appropriate cluster incrementally. When applying the ICTree method of the present disclosure to a large scale image dataset, the ICTree need not be loaded in its entirety into short term memory for processing. Since the ICTree method of the present disclosure can be incrementally implemented, the Image Cluster (IC) nodes can be loaded one (or a few) at a time into short term memory. The branching node parameter, B, can be carefully chosen so that the size of a single IC node is equal to the size of a convenient memory unit (e.g., a disk page) so as to save input/output efficiently (e.g., memory resources, data communication time, processing throughput, etc.).

Figure 4:
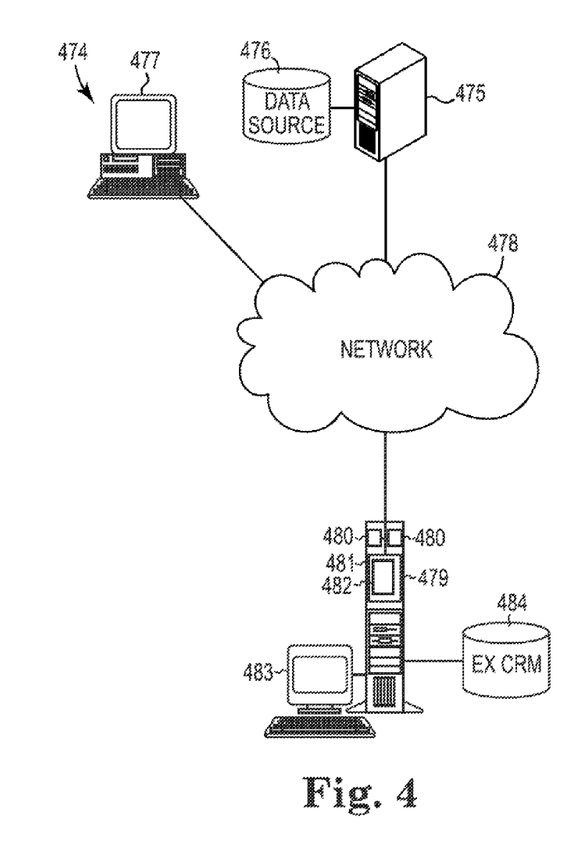
FIG. 4 illustrates a block diagram of an example computing system used to implement an incremental image clustering system according to the present disclosure.

FIG. 4 illustrates a block diagram of an example computing system used to implement an incremental image clustering system according to the present disclosure. The computing system 474 can be comprised of a number of computing resources communicatively coupled to the network 478. FIG. 4 shows a first computing device 475 that may also have an associated data source 476, and may have one or more input/output devices (e.g., keyboard, electronic display). A second computing device 479 is also shown in FIG. 4 being communicatively coupled to the network 478, such that executable instructions may be communicated through the network between the first and second computing devices.

Second computing device 479 may include one or more processors 480 communicatively coupled to a non-transitory computer-readable medium 481. The non-transitory computer-readable medium 481 may be structured to store executable instructions 482 (e.g., one or more programs) that can be executed by the one or more processors 480 and/or data. The second computing device 479 may be further communicatively coupled to a production device 483 (e.g., electronic display, printer, etc.). Second computing device 479 can also be communicatively coupled to an external computer-readable memory 484. The second computing device 479 can cause an output to the production device 483, for example, as a result of executing instructions of one or more programs stored on non-transitory computer-readable medium 481, by the at least one processor 480, to implement a system for incremental image clustering according to the present disclosure. Causing an output can include, but is not limited to, displaying text and images to an electronic display and/or printing text and images to a tangible medium (e.g., paper). Executable instructions to implement incremental image clustering may be executed by the first 475 and/or second 479 computing device, stored in a database such as may be maintained in external computer-readable memory 484, output to production device 483, and/or printed to a tangible medium.

One or more additional computers 477 may also be communicatively coupled to the network 478 via a communication link that includes a wired and/or wireless portion. The computing system can be comprised of additional multiple interconnected computing devices, such as server devices and/or clients. Each computing device can include control circuitry such as a processor, a state machine, application specific integrated circuit (ASIC), controller, and/or similar machine.

The control circuitry can have a structure that provides a given functionality, and/or execute computer-readable instructions that are stored on a non-transitory computer-readable medium (e.g., 476, 481, 484). The non-transitory computer-readable medium can be integral (e.g., 481), or communicatively coupled (e.g., 476, 484) to the respective computing device (e.g. 475, 479) in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium 330 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), Blu-ray discs, compact discs (CD), laser discs, and magnetic media such as tape drives, floppy discs, and hard drives, solid state media such as flash memory, EEPROM, phase change random access memory (PCRAM), as well as other types of machine-readable media.

Logic can be used to implement the method(s) of the present disclosure, in whole or part. Logic can be implemented using appropriately configured hardware and/or machine readable instructions (including software). The above-mention logic portions may be discretely implemented and/or implemented in a common arrangement.

Figure 5:
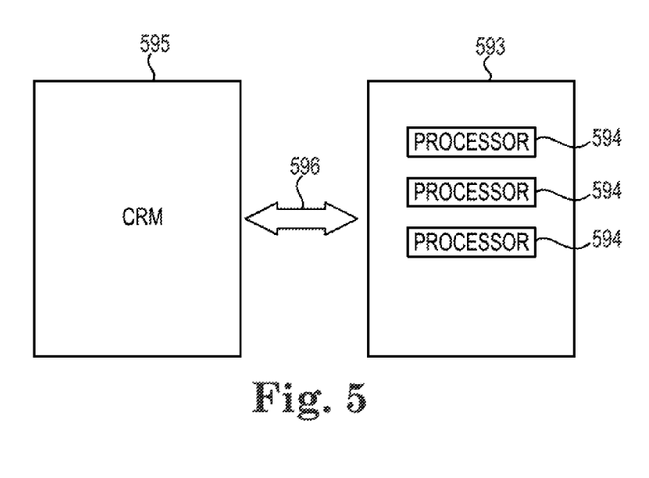
FIG. 5 illustrates a block diagram of an example computer readable medium (CRM) in communication with processing resources according to the present disclosure.

FIG. 5 illustrates a block diagram of an example computer readable medium (CRM) 595 in communication, e.g., via a communication path 596, with processing resources 593 according to the present disclosure. As used herein, processor resources 593 can include one or a plurality of processors 594 such as in a parallel processing arrangement. A computing device having processor resources can be in communication with, and/or receive a tangible non-transitory computer readable medium (CRM) 595 storing a set of computer readable instructions (e.g., software) for capturing and/or replaying network traffic, as described herein.

With the prosperity of digital images, an incremental image clustering method with high efficiency and effectiveness can be beneficial in facilitating image browsing and exploitation. To that end, the ICTree method of the present disclosure, a hierarchical image matching model, can provide distinct advantages and efficiencies over previous approaches.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples provided herein. The above description has been made in an illustrative fashion, and not a restrictive one. Combination of the above examples, and other examples not specifically described herein will be apparent upon reviewing the above description. Therefore, the scope of one or more examples of the present disclosure should be determined based on the appended claims, along with the full range of equivalents that are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." "Embodiment," as used herein, does not necessarily refer to the same embodiment, although it may.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of this disclosure.

Some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for incremental image clustering, comprising:
identifying, via a computing device, a number of candidate nodes from among nodes in an image cluster tree (ICT) based on a similarity between a feature of a new image and an average feature of each of at least one node along each path from a root node to either (i) a leaf node or (ii) a node with the similarity exceeding a first threshold;
determining, via the computing device, a most-similar node from among the number of candidate nodes;
inserting, via the computing device, the new image or the feature of the new image to a node associated with the determined most-similar node based on (i) a comparison of a second threshold to the similarity between the feature of the new image and the average feature of the most-similar node, and (ii) whether the most-similar node is a leaf node.

2. The method of claim 1, further comprising:
initiating a new leaf node containing the new image as a sibling of the root node when no candidate nodes are identified; and
initiating a new root node having child nodes being the root node and the new leaf node.

3. The method of claim 1, further comprising splitting the determined most-similar node after inserting the new image when the resulting child nodes exceed a maximum branching threshold.

4. The method of claim 1, further comprising updating at least one node on the ICT along a path from a root node to the most-similar node to include the feature of the new image and a number of child nodes after the new image is added.

5. The method of claim 1, further comprising periodically re-clustering leaf nodes on the ICT having single images.

6. The method of claim 5, wherein periodically re-clustering leaf nodes on the ICT having single images includes re-clustering leaf nodes on the ICT having single images at a time when no new image is available to be received.

7. The method of claim 5, further comprising reassigning images from the nodes on the ICT having single images to a nearest leaf image cluster node.

8. The method of claim 1, the feature of the new image is associated with a facial feature of a person in a photo.

9. The method of claim 1, wherein the new image or the feature of the new image is inserted into the most-similar node when the most-similar node is a leaf node and the comparison exceeds the second threshold.

10. The method of claim 1, wherein the new image or the feature of the new image is inserted as a sibling node of the most-similar node when the most-similar node is a leaf node and the comparison does not exceed the second threshold.

11. The method of claim 1, wherein the new image or the feature of the new image is inserted as a child node to the most-similar node when the most-similar node is not a leaf node.

12. A method for incremental image clustering, comprising:
    extracting a facial feature from a detected face of a person in a new image to be inserted into an image cluster tree (ICT);
    determining an original feature vector of the facial feature;
    reducing the original feature vector to a reduced feature vector of the facial feature, the reduced feature vector being the feature of the new image;
    identifying, via a computing device, a number of candidate nodes from among nodes in the image cluster tree based on a similarity between the reduced feature vector and an average feature of each of at least one node along each path from a root node to either (i) a leaf node or (ii) a node with the similarity exceeding a first threshold;
    determining, via the computing device, a most-similar node from among the number of candidate nodes; and
    inserting, via the computing device, the reduced feature vector into a node associated with the determined most-similar node.

13. A non-transitory computer-readable medium having computer-readable instructions stored thereon, the computer-readable instructions comprising instructions that, if executed by one or more processors, cause the one or more processors to:
    identify, via a computing device, a number of candidate nodes from among nodes in an image cluster tree (ICT) based on a similarity between a feature of a new image and an average feature of each of at least one node along each path from a root node to either (i) a leaf node or (ii) a node with the similarity exceeding a first threshold;
    determine, via the computing device, a most-similar node from among the number of candidate nodes;
    insert, via the computing device, the new image or the feature of the new image to a node associated with the determined most-similar node based on (i) a comparison of a second threshold to the similarity between the feature of the new image and the average feature of the most-similar node, and (ii) whether the most-similar node is a leaf node.

14. The non-transitory computer-readable medium of claim 13, further having computer-readable instructions stored thereon that, if executed by one or more processors, cause the one or more processors to:
    initiate a new leaf node containing the new image as a sibling of the root node when no candidate nodes are identified; and
    initiate a new root node having child nodes being the root node and the new leaf node.

* * * * *